No. 845,826. PATENTED MAR. 5, 1907.
E. B. SIMS.
SPRING WHEEL.
APPLICATION FILED APR. 21, 1906.
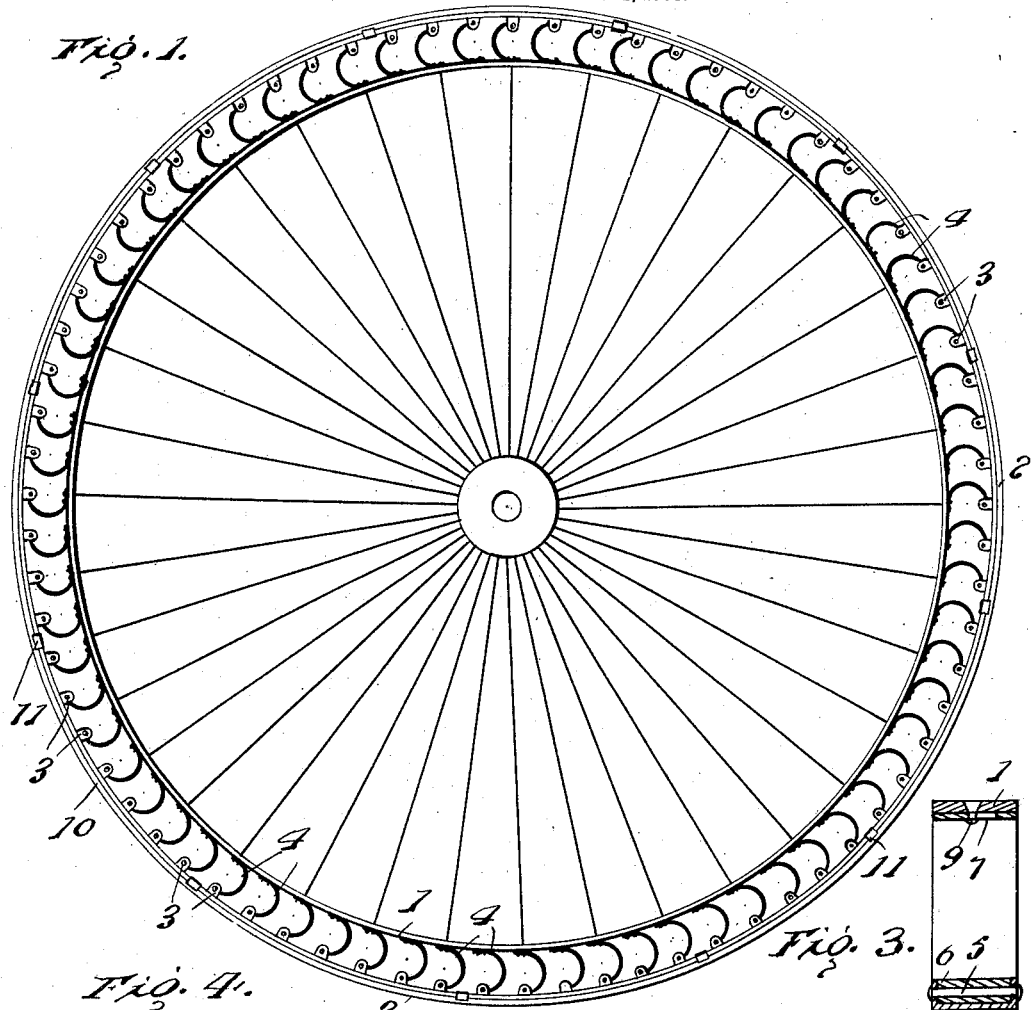
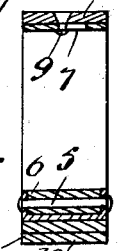
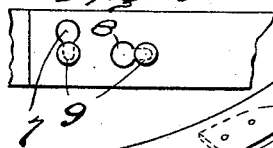
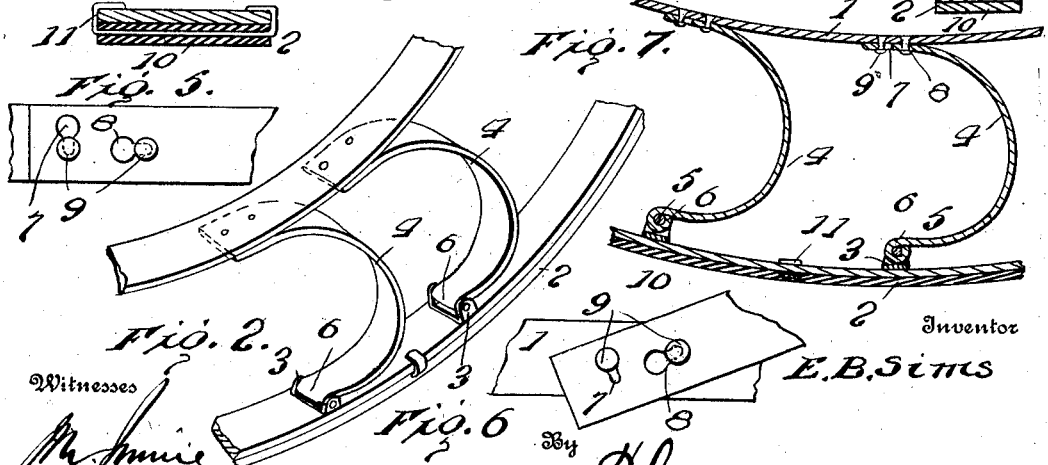
Witnesses
Inventor
E. B. Sims
By
Attorneys

UNITED STATES PATENT OFFICE.

EDWARD B. SIMS, OF WESTERN, NEBRASKA.

SPRING-WHEEL.

No. 845,826.  Specification of Letters Patent.  Patented March 5, 1907.

Application filed April 21, 1906. Serial No. 313,064.

*To all whom it may concern:*

Be it known that I, EDWARD B. SIMS, a citizen of the United States, residing at Western, in the county of Saline and State of Nebraska, have invented certain new and useful Improvements in Spring-Wheels, of which the following is a specification.

This invention has relation to vehicle-wheels provided with yieldable tires, so as to neutralize shock and vibration, and thereby add greatly to the comfort of the party riding in a vehicle mounted upon wheels of the character mentioned.

The invention appertains more particularly to the class of wheels embodying a metallic tire and springs interposed between said tire and the felly and rim of the wheel, and aims to provide an improved structure and securing means whereby any one of the interposed springs may be easily and quickly removed either for purposes of repair or to be replaced by a new spring.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side view of a vehicle-wheel embodying the invention. Fig. 2 is a detail perspective view of a portion of the rim, showing the parts on a larger scale. Fig. 3 is a transverse section of the outer or rim portion of the wheel, on an enlarged scale. Fig. 4 is a transverse section of the tire, showing the covering upon the outer side and the securing means therefor. Fig. 5 is a detail view of the inner end of a spring, showing the keyhole-slots formed therein. Fig. 6 is a detail view showing the manner of placing a spring in position.

Corresponding and like parts are referred to in the following description and indicated in all the views of the drawings by the same reference characters.

The wheel may be of any design or make, according to the style of vehicle for which it is designed. The felly 1 of the wheel may be of metal or wood or a combination thereof or of any suitable material. The tire 2 is continuous and is preferably composed of spring metal, such as steel, and is provided at intervals in its circumferential length with pairs of ears 3, to which the outer ends of springs 4 are pivotally connected by means of pins, bolts, or like fastenings 5, passed through registering openings in the ears 3 and at the outer ends of the springs 4. The ears 3 preferably form parts of strips which are bent near their ends about at a right angle to the body of the strips, the latter being riveted or otherwise fastened to the inner side of the tire 2. The openings or eyes 6 at the outer ends of the springs 4 may be provided in any manner, preferably by bending end portions of the springs upon themselves into cylindrical form.

The springs 4 are preferably curved, being of semicircular form, which has been found to give the best results, since the end thrust is distributed uniformly throughout the springs, thereby enabling the same to be constructed of comparatively light material. The inner ends of the springs are connected to the felly or rim 1 of the wheel in any manner. It is proposed to detachably connect the inner ends of the springs with the felly or rim, thereby making provision for removing any one of the springs either to substitute the same by a new one or for any desired purpose. To provide for the ready attachment and detachment of the springs, keyhole-slots 7 and 8 are provided at the inner ends thereof, the slots 7 being at a right angle to the slots 8. Headed studs or fasteners 9 are attached in any substantial manner to the rim of the wheel, the heads of said fasteners being of a size to pass readily through the enlarged portions of the slots 7 and 8 and the neck of said fasteners corresponding to the contracted portion of the slots. The space between the heads of the fasteners and the rim corresponds exactly to the thickness of the springs, thereby obviating any play of the latter. A pair of studs is had for each spring, one stud or fastener entering the slot 7 and the companion one entering the slot 8. When placing the springs in position, the head of one stud of a pair is passed through the enlarged part of the slot 8 of the spring, and the latter is moved longitudinally to bring the fastener in the contracted part of the slot 8, after which the spring is turned laterally to cause the other stud or fastener of the pair to pass through the enlarged portion of the slot 7, after which the spring is moved into the plane of the wheel and rim and tire, thereby bringing the last-mentioned fastener into the contracted portion of the slot 7. The outer end of the spring is now passed between a pair of ears 3 and connected thereto by the pivot-fastener 5, thereby securing the spring, since it cannot turn to bring the large portion of the slot 7 in register with the head of the coöperating fastener. Should it become necessary to remove any one of the springs for any purpose, the same may be readily effected by disconnecting its outer end from the ears 3, to which it is connected, and subsequently turning the spring to bring the head of the fastener in alinement with the enlarged portion of the slot 7 thereof, and after said slot 7 has been disconnected from the coöperating fastener the spring is moved to bring the companion stud in register with the enlarged portion of the slot 8, thereby freeing the spring, as will be readily comprehended.

To prevent slipping of the tire, as also to obviate noise, its outer side is covered with rubber or other material 10, which may be cemented thereto and secured in any manner. As additional securing means metal strips 11 are passed transversely through the covering 10, and the projecting ends are bent about opposite edges of the tire, as indicated at 12. The transverse strips 11 provide ribs which are of special advantage to increase traction in the event of power being applied to the wheel for driving the vehicle or other conveyance mounted thereon.

Having thus described the invention, what is claimed as new is—

1. In a vehicle-wheel, the combination of a rim, a tire encircling the rim and spaced therefrom, pairs of headed studs applied to one of said parts, a plurality of springs each having at one end a pair of keyhole-slots arranged relatively at a right angle and adapted to make detachable connection with a pair of studs, and means for detachably connecting the opposite ends of the springs to the other pair.

2. In a vehicle-wheel, the combination of a rim, pairs of headed studs applied thereto, a tire encircling the rim and spaced therefrom and provided at intervals in its length with pairs of ears, curved springs having their outer ends bent into approximately cylindrical form and having a pair of keyhole-slots at their inner ends, the slots of each pair having a right-angular arrangement and adapted to coöperate with a pair of headed fasteners, and means for pivotally and detachably connecting the outer ends of the springs to the said ears.

In testimony whereof I affix my signature in presence of two witnesses.

EDWARD B. SIMS. [L. S.]

Witnesses:
 GEO. F. SAWYER,
 CARRIE PATTERSON.